United States Patent
Kawaguchi

(10) Patent No.: US 12,386,857 B2
(45) Date of Patent: Aug. 12, 2025

(54) REMOTE COPY MANAGEMENT

(71) Applicant: HITACHI VANTARA, LTD., Yokohama (JP)

(72) Inventor: Tomohiro Kawaguchi, Santa Clara, CA (US)

(73) Assignee: HITACHI VANTARA, LTD., Yokohama (JP)

(*) Notice: Subject to any disclaimer, the term of this patent is extended or adjusted under 35 U.S.C. 154(b) by 0 days.

(21) Appl. No.: 18/372,930

(22) Filed: Sep. 26, 2023

(65) Prior Publication Data

US 2025/0103614 A1    Mar. 27, 2025

(51) Int. Cl.
*G06F 16/27*    (2019.01)
*G06F 11/14*    (2006.01)

(52) U.S. Cl.
CPC ........ *G06F 16/273* (2019.01); *G06F 11/1464* (2013.01); *G06F 2201/84* (2013.01)

(58) Field of Classification Search
CPC ............ G06F 11/1446; G06F 11/1451; G06F 11/1461; G06F 11/1464; G06F 11/2069; G06F 11/2074; G06F 11/2082; G06F 2201/81; G06F 2201/84; G06F 2201/855; G06F 3/065; G06F 3/067; G06F 16/178; G06F 16/1815; G06F 16/273; H04L 67/1097
See application file for complete search history.

(56) References Cited

U.S. PATENT DOCUMENTS

| | | | |
|---|---|---|---|
| 7,152,079 B2 | 12/2006 | Hirakawa et al. | |
| 11,307,944 B2 | 4/2022 | Kawaguchi | |
| 2006/0080362 A1* | 4/2006 | Wagner | G06F 3/065 |
| 2006/0277376 A1* | 12/2006 | Watanabe | G06F 11/2082 |
| | | | 711/162 |
| 2008/0028171 A1* | 1/2008 | Uratani | G06F 11/2071 |
| | | | 714/E11.102 |
| 2010/0275055 A1* | 10/2010 | Edel | G06F 11/2064 |
| | | | 714/E11.119 |
| 2011/0055500 A1* | 3/2011 | Sasson | G06F 11/1446 |
| | | | 711/E12.103 |
| 2021/0382799 A1* | 12/2021 | Kawaguchi | G06F 16/1815 |
| 2022/0229733 A1* | 7/2022 | Chitloor | G06F 11/1464 |
| 2024/0232020 A1* | 7/2024 | Shveidel | G06F 16/1844 |

* cited by examiner

*Primary Examiner* — Robert W Beausoliel, Jr.
*Assistant Examiner* — Cheryl M Shechtman
(74) *Attorney, Agent, or Firm* — Procopio, Cory, Hargreaves & Savitch LLP

(57) ABSTRACT

Systems and methods can involve, for an execution of a remote copy operation from a primary storage system to a secondary storage system, calculating lag time from a current time and latest copy time received during execution of the remote copy operation. The calculation of the lag time for the execution of the remote copy operation can be conducted by either the primary storage system or the secondary storage system.

12 Claims, 19 Drawing Sheets

Service Catalogue Definition
Service Catalogue 200-2

| Service Name 200-2-1 | Unit Price [USD/day] 200-2-2 | Unit Capacity [GB] 200-2-4 | Remote Copy 200-2-3 | Journal ID 200-2-9 | Recovery Point Objective(s) 200-2-10 | Unit Max Write Throughput [MB/s] 200-2-5 | Unit Min Write Throughput Goal [MB/s] 200-2-6 | Unit Max Read Throughput [MB/s] 200-2-7 | Unit Goal Min Throughput Goal [MB/s] 200-2-8 |
|---|---|---|---|---|---|---|---|---|---|
| Bronze | 0.1 | 100 | No | n/a | n/a | 10 | 0 | 10 | 0 |
| Silver | 0.3 | 100 | No | n/a | n/a | 50 | 0 | 50 | 0 |
| Gold | 0.1 | 100 | No | n/a | n/a | 50 | 20 | 50 | 40 |
| Bronze DR | 0.5 | 100 | Yes | 2 | 3600 | 10 | 0 | 10 | 0 |
| Silver DR | 1.5 | 100 | Yes | 1 | 600 | 50 | 0 | 50 | 0 |
| Gold DR | 5.0 | 100 | Yes | 0 | 60 | 50 | 20 | 50 | 40 |

FIG. 4

Volume Database 200-3

| Volume Name 200-3-1 | Type 200-3-2 | Units 200-3-3 | Sites 200-3-4 | Storage Device 200-3-5 |
|---|---|---|---|---|
| Test-0 | Bronze | 1 | 1a | 100a |
| Test-1 | Bronze | 1 | 1a | 100c |
| Test-2 | Silver | 1 | 1b | 100b |
| Test-3 | Silver DR | 1 | 1a, 1b | 100a, 100b |
| Prod-0 | Gold | 8 | 1a | 100c |
| Prod-1 | Gold DR | 8 | 1a, 1b | 100a, 100b |

Storage Resource Database 200-4

| Storage Device 200-4-1 | Capacity [TB] 200-4-2 | Max Read Throughput [MB/s] 200-4-3 | Max Read Throughput [MB/s] 200-4-4 |
|---|---|---|---|
| 100a | 2000 | 500 | 1000 |
| 100b | 1000 | 300 | 600 |
| 100c | 2000 | 500 | 1000 |
| 100d | 1000 | 300 | 600 |

FIG. 6

Lag Time Log Database 200-5

| Journal ID 200-5-1 | Storage Device 200-4-2 | Time 200-4-3 | Lag Time 200-4-4 |
|---|---|---|---|
| 0 | 100b | 0:00:00 | 3.13 |
| | | 0:01:00 | 0.06 |
| | | 0:02:00 | 4.82 |
| | | 0:03:00 | 3.58 |
| | | 0:04:00 | 2.77 |
| | | 0:05:00 | 1.60 |
| | 100d | 0:00:00 | 2.65 |
| | | 0:01:00 | 0.21 |
| | | 0:02:00 | 0.82 |
| | | 0:03:00 | 3.87 |
| | | 0:04:00 | 1.68 |
| | | 0:05:00 | 4.08 |
| 1 | 100b | 0:00:00 | 3.48 |
| | | 0:01:00 | 3.97 |
| | | 0:02:00 | 3.05 |
| | | 0:03:00 | 4.91 |
| | | 0:04:00 | 3.93 |
| | | 0:05:00 | 2.07 |
| | 100d | 0:00:00 | 0.92 |
| | | 0:01:00 | 4.76 |
| | | 0:02:00 | 2.50 |
| | | 0:03:00 | 2.11 |
| | | 0:04:00 | 1.18 |
| | | 0:05:00 | 1.43 |
| 2 | 100b | 0:00:00 | 3.47 |
| | | 0:01:00 | 2.94 |
| | | 0:02:00 | 3.13 |
| | | 0:03:00 | 4.63 |
| | | 0:04:00 | 2.92 |
| | | 0:05:00 | 3.84 |
| | 100d | 0:00:00 | 2.13 |
| | | 0:01:00 | 1.69 |
| | | 0:02:00 | 4.94 |
| | | 0:03:00 | 4.25 |
| | | 0:04:00 | 1.23 |
| | | 0:05:00 | 1.92 |

FIG. 7

Storage Device 100a

Volume/Pair Management Table 101-1a

| Volume# 101-1-1 | Attribution 101-1-2 | Pair Storage# 101-1-3 | Pair Volume# 101-1-4 | Journal ID 101-1-5 | Pair State 101-1-8 |
|---|---|---|---|---|---|
| 1 | Primary | 2 | 3 | 1 | PAIR |
| 2 | Journal | - | - | - | - |
| 3 | Primary | 2 | 5 | 0 | PAIR |
| 4 | Primary | 2 | 4 | 2 | COPY |

Journal Management Table 101-2a

| Journal ID 101-2a-0 | Journal Volume # 101-2a-1 | Last Issued Seq# 101-2a-2 | Time of Last Processed Marker 101-2a-4 |
|---|---|---|---|
| 0 | 2 | 123456 | 1581388656151 |
| 1 | 7 | 213316 | 1581388657266 |
| 2 | 5 | 949442 | 1581388654385 |

Storage Device 100b

Volume/Pair Management Table 101-1b

| Volume# 101-1-1 | Attribution 101-1-2 | Pair Storage# 101-1-3 | Pair Volume# 101-1-4 | Journal ID 101-1-5 | Pair State 101-1-8 |
|---|---|---|---|---|---|
| 1 | Journal | - | - | - | - |
| 2 | Secondary | 1 | 3 | 1 | PAIR |
| 3 | Secondary | 1 | 1 | 1 | PAIR |
| 4 | Secondary | 1 | 4 | 1 | COPY |

Journal Management Table 101-2b

| Journal ID 101-2b-0 | Journal Volume # 101-2b-1 | Last Received Seq. # 101-2b-2 | Time of Last Received Marker 101-2b-4 | Copy Pace [MB/s] 101-2b-5 |
|---|---|---|---|---|
| 0 | 1 | 123432 | 15813886524672 | 300 |
| 1 | 8 | 213310 | 15813886512628 | 200 |
| 2 | 6 | 949421 | 15813886535166 | 100 |

FIG. 10

$$B \le \sum_{j}^{m} \zeta_j\, b_j,\ 0 \le \zeta_j \le 1 \qquad \text{F200}$$

$$b_j \ge \sum_{i}^{n} \delta_{ij}\, p_i\, W_i,\ \sum_{j}^{m} \delta_{ij} = 1,\ w_i \le p_i\, W_i,\ 0 \le p_i \le 1 \qquad \text{F201}$$

B: Network bandwidth
$b_j$: Assigned bandwidth for the group $j$ having same RPO setting
$n$: number of existing volumes
$m$: number of groups having same RPO setting
$W_i$: Max throughput limit set for the volume specified by identifier $i$
$w_i$: Min throughput goal set for the volume specified by identifier $i$
$p_i$: Degree of throttling for the max performance limit to volume $i$
$\delta_{ij}$: 1 if volume $i$ belong the group $j$ having same RPO setting, 0 otherwise
$\zeta_j$: Degree of throttling for remote copy of the group $j$ having same RPO setting
Default to 1, less than if other unsuspended groups are prioritized, and 0 if suspended

FIG. 18

REMOTE COPY MANAGEMENT

BACKGROUND

Field

The present disclosure is generally directed to storage systems, and more specifically, to remote copy management for storage systems.

Related Art

In related art storage systems, important data is stored redundantly between remote locations to avoid loss by disaster such as fire, earthquake and/or terrorism. The storage devices provide features known as "storage remote copy" which copies data between paired storage volumes and maintains data consistency when a host computer issues a data write operation.

Such storage remote copy operations are categorized into synchronous storage remote copy and asynchronous remote copy. If the distance between the storage locations is short, a synchronous copy is often selected because it allows for no data loss and immediate fail-over on disaster.

However, in implementations involving short distance storage remote copy, it can be difficult to protect data against wide-area disasters such as large earthquakes and hurricanes. The farther the distance between the systems, the more resilient the system becomes to such disaster. However, such implementations also result in longer communication delays for data transfer. For example, there can be about one millisecond of delay for every 100 kilometers of distance.

To address such limitations in the related art, example implementations are directed to asynchronous storage remote copy for especially important data, application, or business.

In the related art, there can be a method for realizing asynchronous remote copy among storage devices keeping data consistency, and periodically inserting time information into that transferred data. In another related art implementation, there is a method for asynchronous storage remote copy which assures consistency of data write sequence by using journal.

SUMMARY

When the amount of data written per unit of time exceeds the network bandwidth, a large amount of data that cannot be transferred will accumulate, resulting in large data gaps between storage devices and potentially leading to reduced availability. If the availability is included in the storage service contract, the transfer bandwidth for remote copying should be secured according to that contract. If it is violated, the penalty should be reduced.

To prevent the occurrence of the above problems, ample storage network resources as well as strict system design have been used in the past, but this has had a significant impact on costs.

To address the issues of the related art as noted above, example implementations described herein involve a method for deriving the lag time of data copying between two storage facilities in asynchronous remote copy; and a method for controlling the remote copy bandwidth in cases where the lag time increases.

A key technology for deriving the lag time in example implementations can involve the steps for the storage system as follows: periodically inserting a marker with time information into the journal of the asynchronous remote copy, getting the latest copy time by finding the latest transferred marker or the oldest untransferred marker and referencing that time information stored in the found marker, and calculating lag time from the current time and the latest copy time.

A key technology for controlling the remote copy is in example implementations can involve the configuration and steps for the storage system as follows: provide two or more policies related to lag time limits of remote copy; one of the policies is set for each volume to which the remote copy is applied, and the other policy is set for each volume to which the remote copy is applied. Calculate the lag time for each group of volumes associated with the policy, and when a lag time reaches the limit set in the policy, limits the copy transfer rate of a volume relating to the policy. When two lag times reach the limits set in each policy, suspends remote copy of a volume relating to the less restrictive (having lower limit) policy.

The disclosure relates generally to storage systems, and more specifically to measuring lag time and controlling copy priority according to the lag time for asynchronous remote copy.

Aspects of the present disclosure can involve a method, which can include, for an execution of a remote copy operation from a primary storage system to a secondary storage system, calculating lag time from a current time and latest copy time received during execution of the remote copy operation.

Aspects of the present disclosure can involve a computer program, storing instructions for executing a process, which can include, for an execution of a remote copy operation from a primary storage system to a secondary storage system, calculating lag time from a current time and latest copy time received during execution of the remote copy operation. The computer program and instructions can be stored on a non-transitory computer readable medium and executed by one or more processors.

Aspects of the present disclosure can involve a system, which can include, for an execution of a remote copy operation from a primary storage system to a secondary storage system, means for calculating lag time from a current time and latest copy time received during execution of the remote copy operation.

Aspects of the present disclosure can involve an apparatus, which can include a processor, configured to, for an execution of a remote copy operation from a primary storage system to a secondary storage system, calculate lag time from a current time and latest copy time received during execution of the remote copy operation.

BRIEF DESCRIPTION OF DRAWINGS

FIG. 4 illustrates an example screen image that Storage Management Service 200-1 displays to Storage Provider 301 for Service Catalog Configuration 201-*u*4, in accordance with an example implementation.

FIG. 6 illustrates examples of databases for managing information on storage system configurations and resources managed by the storage service, in accordance with an example implementation.

FIG. 7 illustrates examples of databases for managing information on storage system log recorded by the storage service, in accordance with an example implementation.

FIG. 10 illustrates examples of Volume/Pair Management Table 101-1*a* and 101-1*b*, in accordance with an example implementation.

FIG. 18 illustrates example formulations to calculate bandwidth set for each journal group copy and write throughput set for each volume, in accordance with an example implementation.

DETAILED DESCRIPTION

Figure 1:
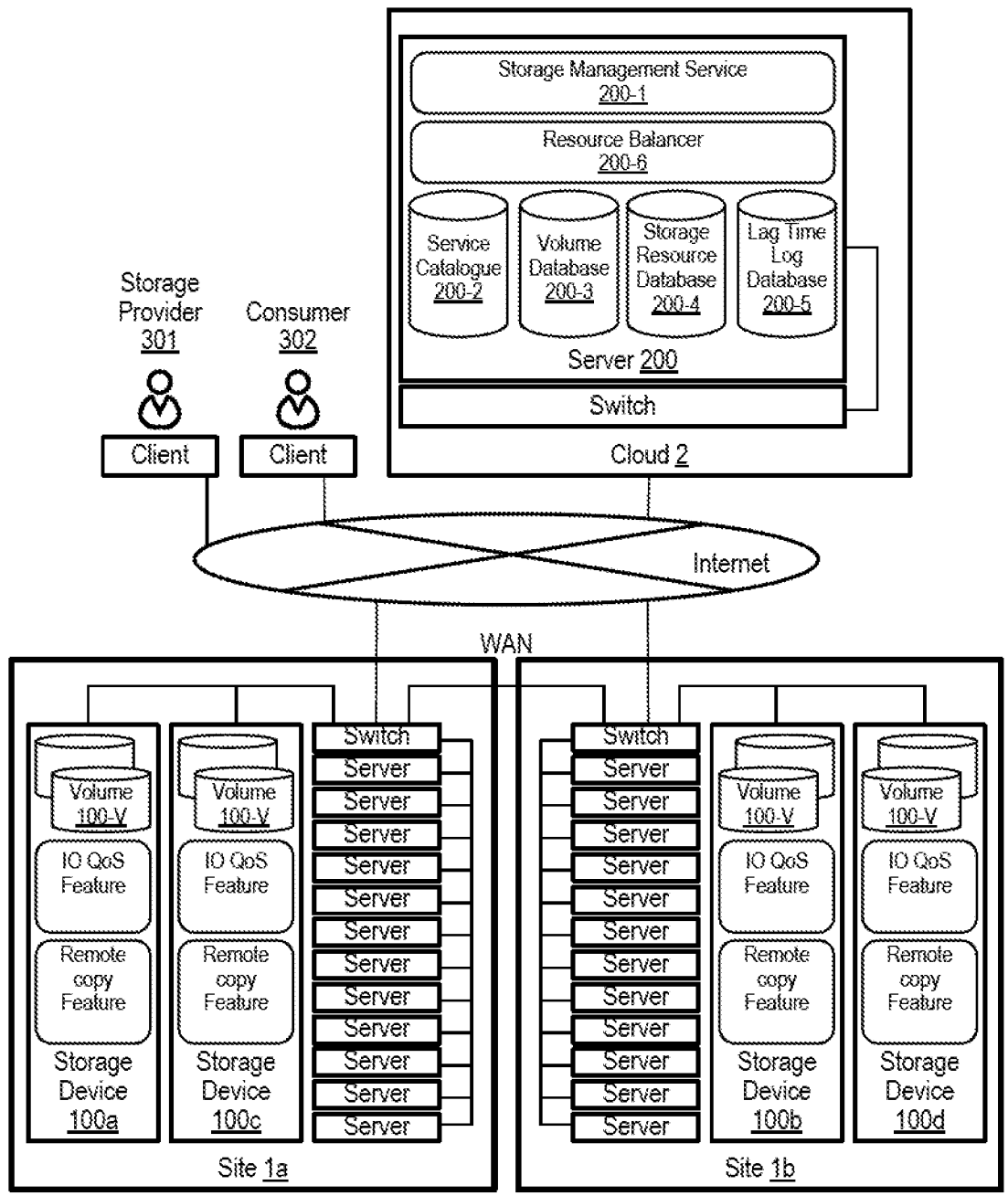
FIG. 1 illustrates the overall system structure, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art of practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates the overall system structure, in accordance with an example implementation. The system includes multiple sites 1*a*, 1*b* and Cloud 2, which are connected to each other via the Internet. Provider 301 manages the system for providing storage services, and Consumer 302 operates the storage services over the Internet.

The applications for the storage services provided at sites 1*a* and 1*b* are executed in Cloud 2. The storage service application involves the storage management service 200-1 and the databases it uses: service catalog 200-2, volume database 200-3, storage resource management database 200-4, and lag time log database 200-5.

Service catalog 200-2 stores a list of services and their settings provided by the provider 301 to the Consumer 302. Volume database 200-3 stores a list of volumes provided by the system. Storage resource management database 200-4 stores resource information on performance and capacity that is provided by each storage device 100*a*, 100*b*. Lag time Log database 200-5 stores information on bandwidth available for data transfer in remote copy. Sites 1*a* and 1*b* are connected by a network such as a Wide Area Network (WAN).

Each site has a computer server, storage devices 100*a* and 100*c*, or, 100*b* and 100*d*, and switches, which are connected by a network such as LAN (Local Area Network) and/or SAN (Storage Area Network). The storage device may be provided by a general-purpose server running storage software rather than a dedicated device, depending on the desired implementation. Some virtual machine, container, and application run on the server and its data can be stored on the storage device 100*a*, 100*c*.

In addition, each storage device 100*a*, 100*c* can involve an Input/Output Quality of Service (IO QoS) feature for volumes and a remote copy feature for data stored on the volumes 100-V.

Figure 2:
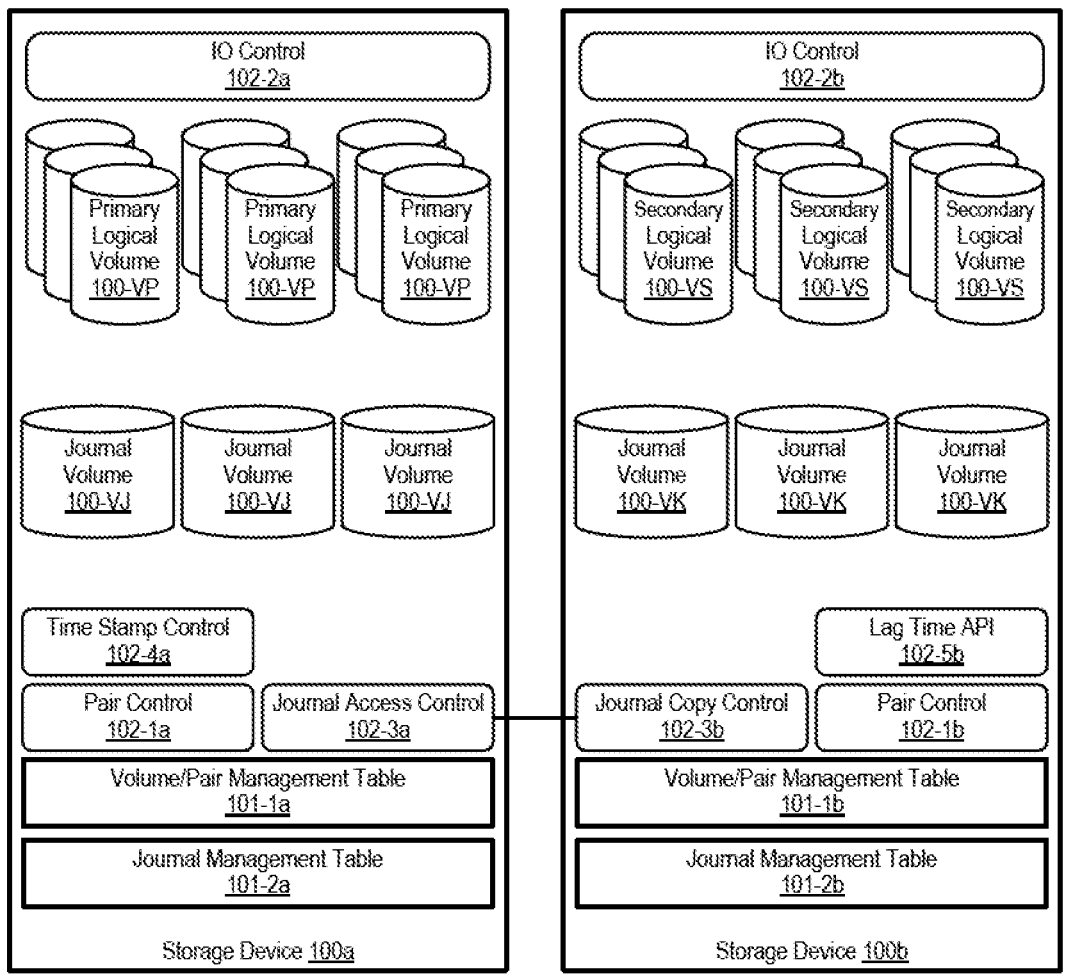
FIG. 2 illustrates a logical configuration of high available system using asynchronous storage remote copy, in accordance with an example implementation

FIG. 2 illustrates a logical configuration of high available system using asynchronous storage remote copy, in accordance with an example implementation. Each control program is executed in the Central Processing Unit (CPU) of a device. Each management table is stored in memory and used by the CPU of a device. Each logical object is provided by CPU using the control program and the management table.

Storage Device 100*a* includes the following. Primary Volume 100-VP receives I/O (input/output) command from a server. The server publishes CDB (Command Descriptor Block) for the I/O which includes LBA (Logical Block Address) to the volume. When receiving a read I/O command, the storage device transfers data stored in the drives or the memory. After receiving write I/O command, the storage device stores data to the memory or drives. This volume is a primary volume of a remote copy pair formed with Secondary Volume 100-VS as described below. Journal Volume 100-VJ is provided so that the storage device stores data in update (write I/O receiving) order on Primary Volume 100-VP. The data for each write I/O is called "journal data".

Control programs include the following. Pair Management Control 102-1*a* controls the pair state which changes on events such as pair operation. Input/Output (IO, also referred herein as I/O) Control 102-2a controls the IO behavior of Primary Volumes 100-VP according to that pair states, such as prohibition and storing to journal volume. Journal Access Control 102-3a controls access for journal data required from the paired storage device. Time Stamp Control 102-4a provides inserting markers to Journal Volumes 100-VJ with current time information periodically.

Management tables include the following. Volume/Pair Management Table 101-1a stores volume attribution, ID (identifier) of paired volume, pair state, ID of using journal volume, and information of quorum to manage logical volumes. Journal Management Table 101-2a stores journal information to manage journal volumes and remote copy process.

Storage Device 100b includes logical objects as follows. Secondary Volume 100-VS receives I/O (input/output) command from a server. The server publishes COB (Command Descriptor Block) for the I/O which includes LBA (Logical Block Address) to the volume. When receiving a read I/O command, the storage device transfers data stored in the drives or the memory. After receiving a write I/O command, the storage device stores data to the memory or drives. This volume is a secondary volume of a remote copy pair formed with Primary Volume 100-VP described above. Journal Volume 100-VK is used such that the storage device copies data from Journal Volume 100-VJ which is stored written data to Primary Volume 100-VP in update (write I/O receiving) order. Journal Volume 100-VK provides capacity to store data or journal data for logical volumes and journal volumes.

Storage Device 100b can involve control programs which can include the following. Pair Management Control 102-1b controls the pair state which changes on events such as pair operation and failure. IO Control 102-2b controls the IO behavior of Secondary Volumes 100-VS according to that pair states, such as prohibition. Journal Copy Control 102-3b is configured to copy journal data from Journal Volume 100-VJ and promote that journal data to Secondary Volume 100-VS. Lag Time API 102-5b provides an interface to get lag time of remote copy.

The management tables can involve volume/pair management table 101-1b and journal management table 101-2b. Volume/Pair Management Table 101-1b stores volume attribution, ID of paired volume, pair state, ID of using journal volume, and information of the quorum to manage logical volumes. Journal Management Table 101-2b stores journal information to manage journal volumes and remote copy process.

Figure 3:
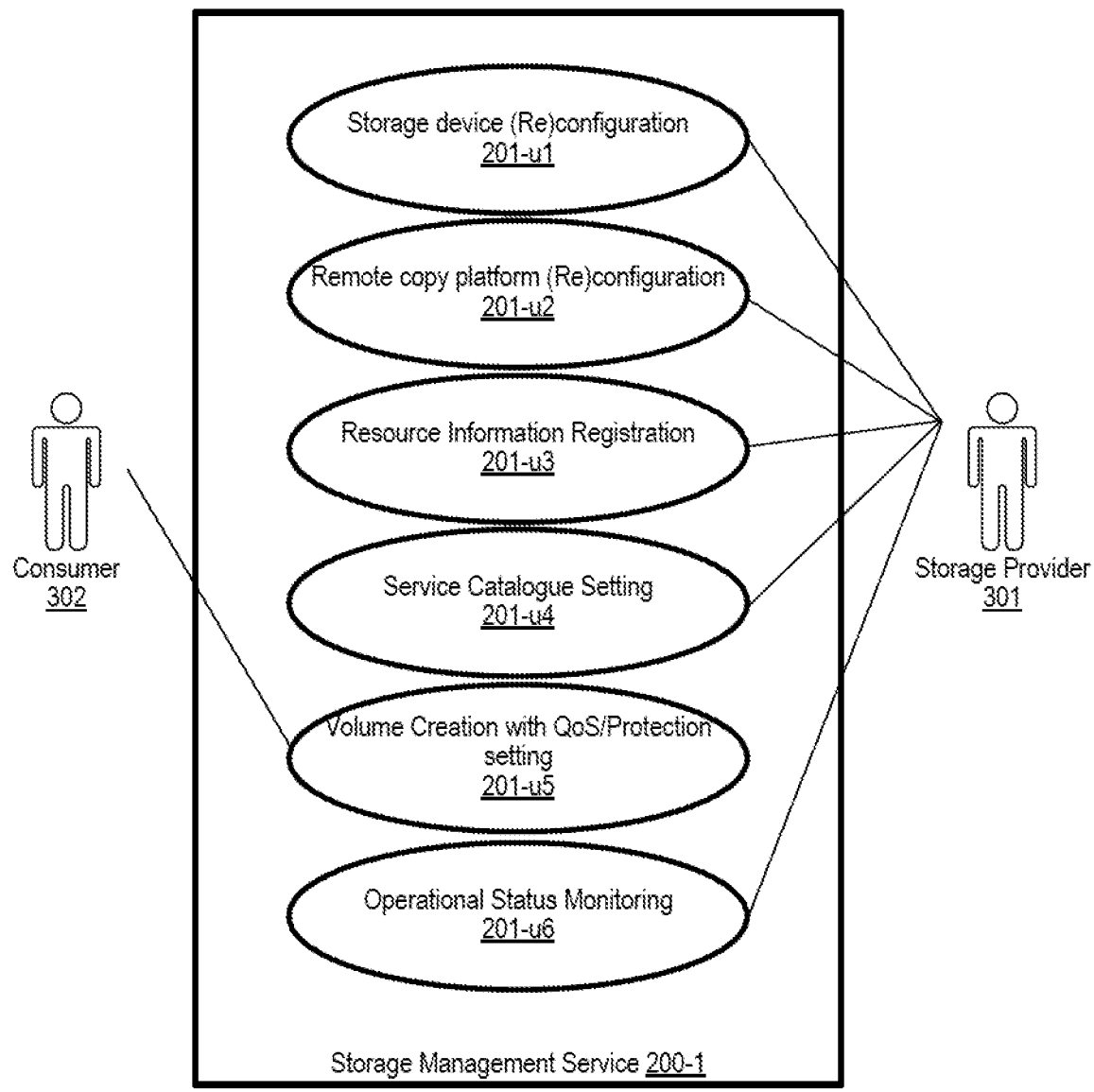
FIG. 3 illustrates an example use case diagram for Storage Management Service 200-1, in accordance with an example implementation.

FIG. 3 illustrates an example use case diagram for Storage Management Service 200-1, in accordance with an example implementation. Storage provider 301 performs Storage Device Configuration 201-u1, Remote Copy Platform Configuration 201-u2. Resource Information Registration 201-u3, Service Catalog Setting 201-u4, and Operational Status Monitoring 201-u6. Consumer 302 performs Volume Creation 201-u5.

In Storage Device Configuration 201-u1, Storage Provider 301 performs drive installation on storage devices, pool configuration, network configuration for hosts, and so on. It may be reconfigured as system requirements change.

In Remote Copy Platform Configuration 201-u2, Storage Provider 301 performs network settings between storage devices between the sites, buffer capacity (journal area) settings for data transfer, and so on. It may be reconfigured as system requirements change.

In Resource Information Registration 201-u3, Storage Provider 301 registers available capacity and IO performance for each storage and available bandwidth for remote copy for network. This operation can be done by automatic generation from the system configuration, rather than manual input by the provider. Storage Provider 301 will change parameters when there is a change in system configuration.

In Service Catalog Setting 201-u4, Storage Provider 301 registers the service name of storage volume to be provided and the corresponding capacity and performance policies.

In Volume Creation 201-u5, Consumer 302 selects, from the offered storage services, the one suitable for their use and expense and creates the volume.

In Operational Status Monitoring 201-u6, Storage Provider 301 monitor the providing services for violations and future resource shortages.

FIG. 4 illustrates an example screen image that Storage Management Service 200-1 displays to Storage Provider 301 for Service Catalog Configuration 201-u4, in accordance with an example implementation. This screen displays the information stored in the Service Catalog 200-2 and accepts edits. Service Catalog 200-2 manages a list of storage volume provisioning services tied to the Service Name 200-2-1, and includes Unit Price 200-2-2, Unit Capacity 200-2-4, Remote Copy Application Information 200-2-3, Journal ID 200-2-9, Recovery Point Objective 200-2-10, Unit Maximum Write Throughput 200-2-5, Unit Minimum Write Throughput Goal 200-2-6, Unit Maximum Read Throughput 200-2-7, and Unit Minimum Read Throughput Goal 200-2-8.

Service Name 200-2-1 is a unique name in the system for the service. Unit Price 200-2-2 is the cost that will be incurred when one unit of the service is purchased. Unit Capacity 200-2-4 is the unit size of volume for the service. In this example, a user needs to purchase two units if the user requires 200 GB volume.

Remote Copy Application Information 200-2-3 indicates whether the target service uses remote copy or not. Unit Maximum Write Throughput 200-2-5 indicates the maximum write throughput performance that can be obtained when purchasing one unit of the service. Unit Minimum Write Throughput Goal 200-2-6 indicates the minimum write throughput performance that can be expected to be achieved when purchasing one unit of the service. Unit Maximum Read Throughput 200-2-7 indicates the maximum write throughput performance that can be obtained when purchasing one unit of the service. Unit Minimum Read Throughput Goal 200-2-8 indicates the minimum write throughput performance that can be expected to be achieved when purchasing one unit of the service.

Figure 5:
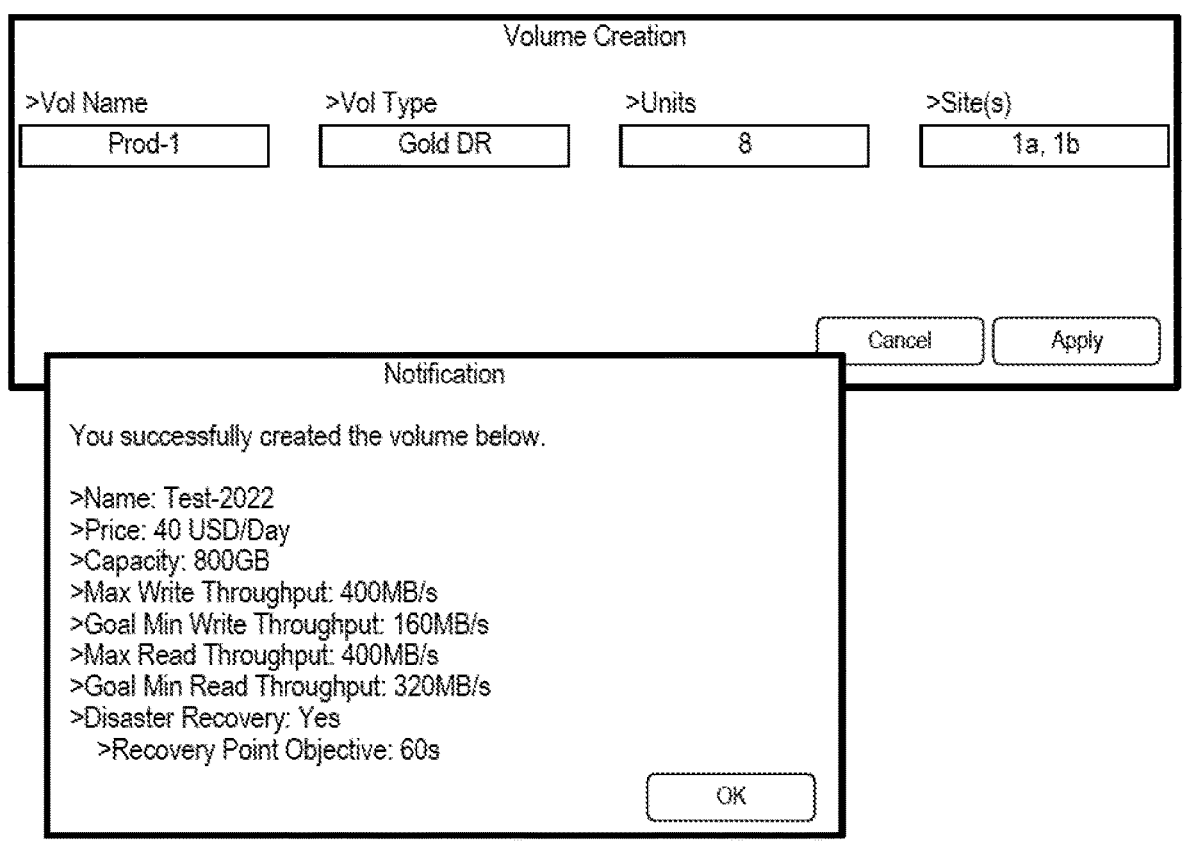
FIG. 5 illustrates an example screen image displayed by the Storage Management Service 200-1 to the Consumer 302 to ask them to enter the settings for the volume to be purchased for Volume Creation, in accordance with an example implementation.

FIG. 5 illustrates an example screen image displayed by the Storage Management Service 200-1 to the Consumer 302 to ask them to enter the settings for the volume to be purchased for Volume Creation 201-u5, in accordance with an example implementation. As illustrated in FIG. 5, the interface can be configured to receive a selection of a volume type from a plurality of pre-defined volume types as defined from FIG. 4, and the formed request is based on a received selection of the volume type made to the interface.

Consumer 302 names the individual volume, selects a policy from the information provided in the service catalog, and enters the number of units to be set for the target volume and the site information where the volume will be created. If the volume is successfully created, the policy set for the volume is displayed.

FIG. 6 illustrates examples of databases for managing information on storage system configurations and resources managed by the storage service, in accordance with an example implementation. Volume Database 200-3 stores information on volumes created as a result of volume creation operations by Consumer 302. It stores the name of the volume 200-3-1, the name of the policy to be used 200-3-2, the number of units purchased 200-3-3, the name of the site where the volume was created 200-34, and the name of the storage device where the volume was created 200-3-5. When using the remote copy feature, information regarding two storage units and the associated site is stored.

Storage Resource Database 200-4 stores information on available storage resources for each storage device registered as a result of Resource Information Registration 201-$u$3. It stores the storage identifier (ID) of the storage device 200-4-1, available capacity 200-4-2, maximum write throughput 200-4-3, and maximum read throughput 200-44.

FIG. 7 illustrates examples of databases for managing information on storage system log recorded by the storage service, in accordance with an example implementation. Lag Time Log Database 200-5 is updated automatically and stores journal ID 200-5-1 which corresponds to Journal ID 200-2-9. It also stores the name of storage device 200-4-2 which provides secondary volumes, time of getting lag time 200-4-3, and lag time 200-4-4.

Figure 8:
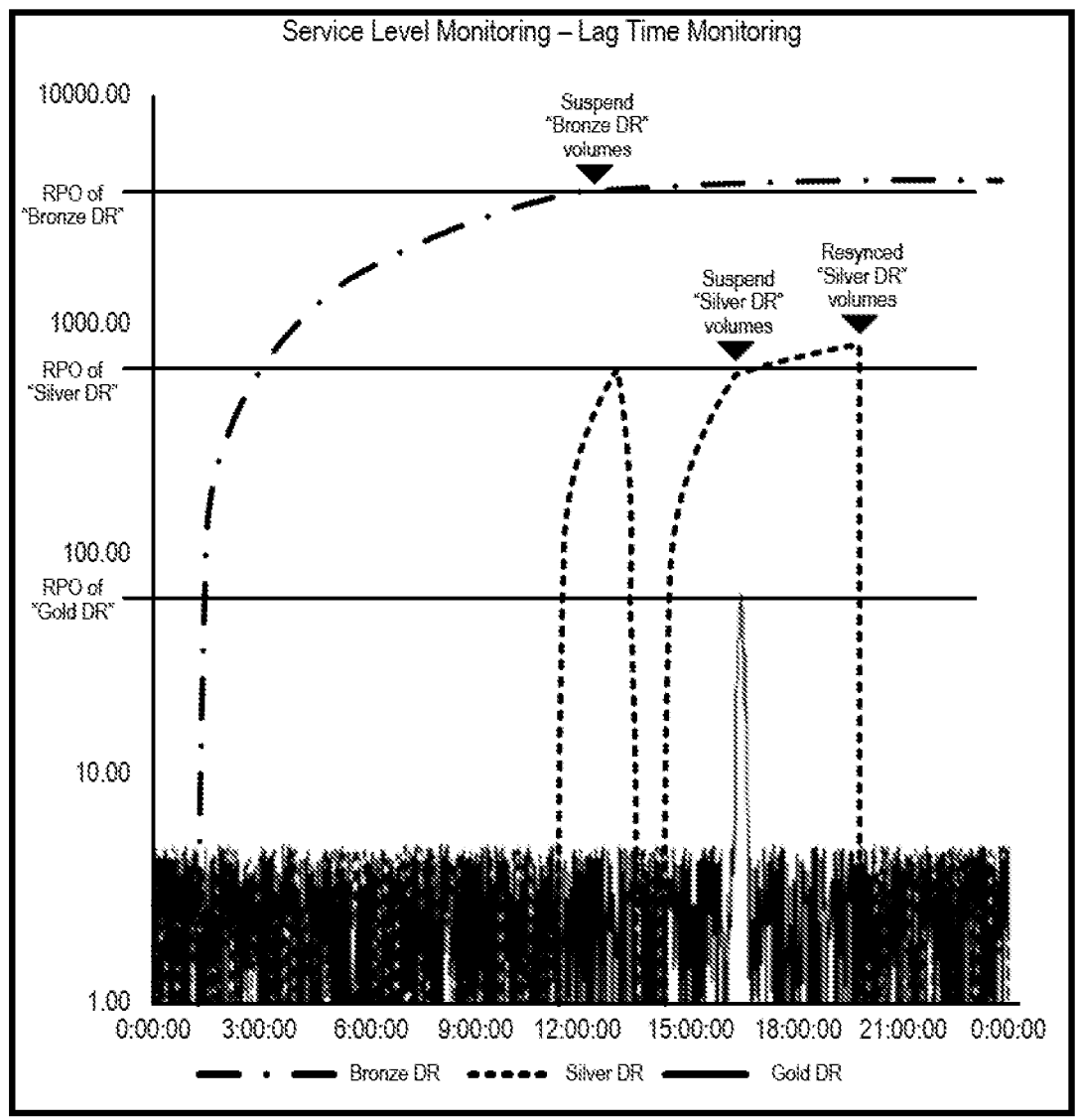
FIG. 8 illustrates an example screen image displayed by the Storage Management Service 200-1 to the Storage Provider 301 to monitor lag time of each policy setting for Operational Status Monitoring 201-*u*6, in accordance with an example implementation.

FIG. 8 illustrates an example screen image displayed by the Storage Management Service 200-1 to the Storage Provider 301 to monitor lag time of each policy setting for Operational Status Monitoring 201-$u$6, in accordance with an example implementation.

As illustrated in FIG. 8, plots are in a single logarithmic graph with time on the horizontal axis and lag time on the vertical axis. Service Name 200-2-1 displayed in Remote Copy Application Information 200-2-3 that are "Yes" are stored. The largest value at the same time 200-4-3 is retrieved from Lag 2004-4 and plotted.

Event indicator indicates when an event such as a remote copy suspend or resync occurs; the log information is displayed in relation to the time of the event. Recovery Point Objective (RPO) 200-2-10 set for each policy is also displayed in the chart.

Figure 9:
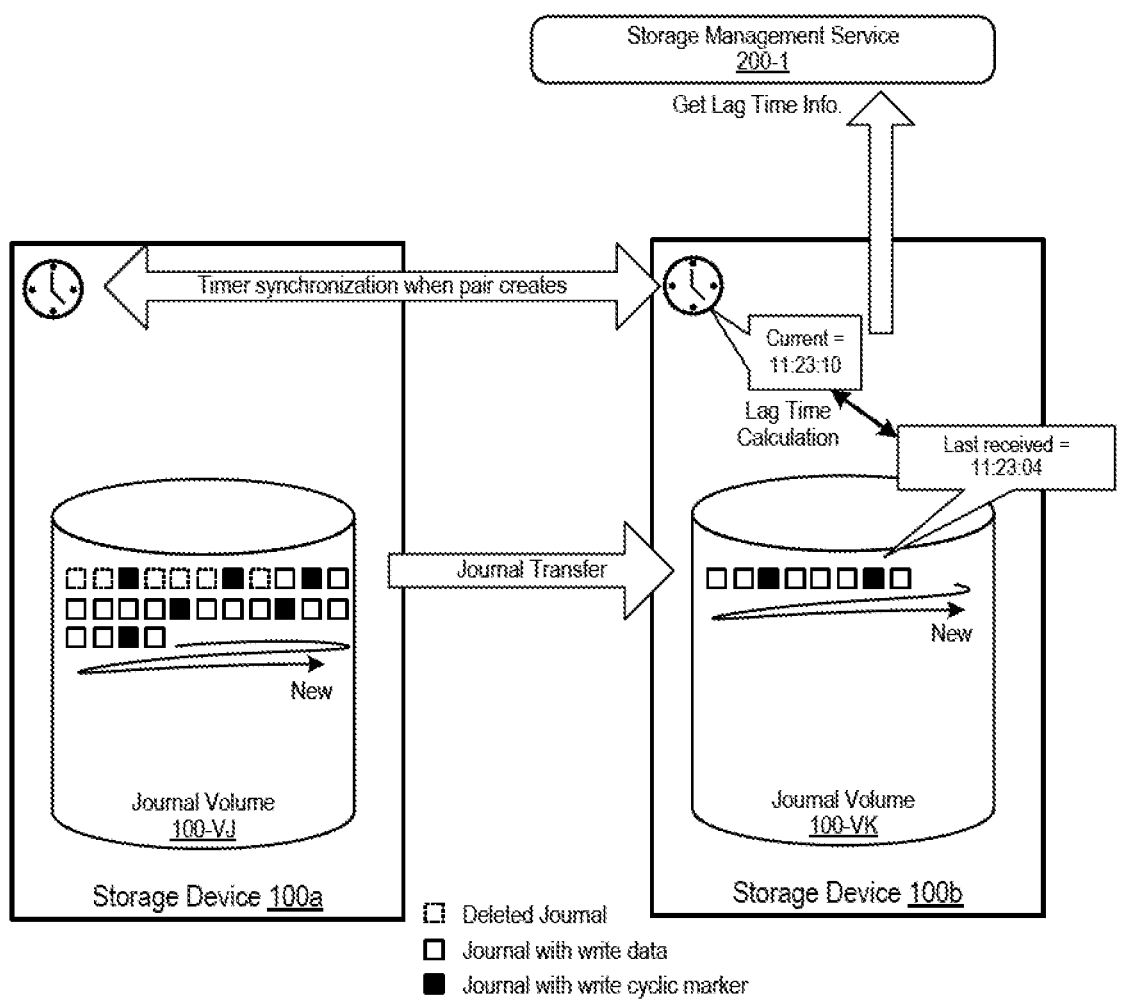
FIG. 9 illustrates an overview of the system, in accordance with an example implementation.

FIG. 9 illustrates an overview of the system, in accordance with an example implementation. Storage devices 100$a$ and 100$b$ have a clock time that are almost the same. The error (difference) is small enough that it can be ignored. This can be accomplished by using GPS (Global Positioning System) or NTP (Network Time Protocol), or otherwise depending on the desired implementation. When a pair is established by Storage Device 100$a$, the Journal Volume 100-VJ stores journal data by duplication of primary volumes in Storage Device 100$a$. After the pair is established, Storage Device 100$b$ gets journal data from Journal Volume 100-VJ, and stores to Journal Volume 100-VK.

If Storage Device 100$b$ finds markers in the transferred journal data when storing it to Journal Volume 100-VK, Storage Device 100$b$ updates the last received time to the time information in the latest marker found. Storage Management Service 200-1 gets the lag time from Storage Device 100$b$ periodically, and records it with the current time information.

FIG. 10 illustrates examples of Volume/Pair Management Table 101-1$a$ and 101-1$b$, in accordance with an example implementation. Both tables have the same elements. Table 101-1$a$ is stored in Storage Device 100$a$, and table 101-1$b$ is in Storage Device 100$b$. Volume Number 101-1-1 include ID of volume in the storage device.

Volume Attribution 101-1-2 stores the attribution of the volume (e.g., Primary, Secondary, Journal, or —(null) is stored). "Primary" indicates that the volume is the primary volume of the remote copy. "Secondary" indicates that the volume is the secondary volume of the remote copy. "Journal" indicates that the volume is the journal volume of the remote copy. "—(null)" indicates that the volume is not used for the remote copy.

Pair Storage Number 101-1-3 indicates the ID of the storage device which a paired volume of the volume is located. Pair Volume Number 101-1-4 is the ID of a volume in that storage device which the volume paired. Journal ID 101-1-5 is the ID of a journal volume which the volume uses. Pair State 101-1-8 is the pair state of the volume, wherein states such as SMPL, COPYPND, COPY, PAIR, PSUS, SSUS, PSWS, SSWS, PSUE, (mull) is stored to the field.

SMPL state indicates that the volume is in progress to establish a pair. COPYPND state indicates that the volume is in progress to establish pair. COPY state indicates that the volume is in progress for initial copy between primary and secondary volume. PAIR state indicates that the volume and that paired volume is synchronizing data if that primary volume data is updated, and both of those storage devices is reachable to that quorum device. PSUS state indicates that the volume is a primary volume of that pair and accepts I/O of that data, and the duplication does not work. SSUS state indicates that the volume is a secondary volume of that pair and does not accept I/O of that data, and the duplication does not work. PSWS state indicates that the volume is a primary volume of that pair and does not accept I/O of that data, and the duplication does not work. SSWS state indicates that the volume is a secondary volume of that pair and accepts I/O of that data, and the duplication does not work. PSUE indicates that the volume has a pair but it does not accept I/O of that volume. —(null) indicates that the volume is not used for a logical volume.

Journal Management Table 101-2$a$ manages information of a journal volume for primary volumes. Journal ID 101-2$a$-0 indicates the ID of a journal group. Journal Volume Number 101-2$a$-1 indicates the ID of a journal volume managed by the journal group. Last Issued Sequence Number 101-2$a$-2 indicates the ID of the last issued journal data. Each journal data has an ID which is issued incrementally. Thus, a lower ID means that is the journal data is older.

Time of Last Processed Marker 101-2$a$-4 indicates the time stored in the newest marker.

Journal Management Table 101-2$b$ includes the following information. Journal ID 101-2$b$-0 indicates the ID of a journal group. Journal Volume Number 101-2$b$-1 indicates the ID of a journal volume managed by the journal group. Last Received Sequence Number 101-$b$-2 is the ID of the newest journal data received in the series. Time of Last Received Marker 101-2$b$-4 is the time stored in the newest marker. Copy Pace 101-2$b$-5 is target maximum throughput for remote copying.

Figure 11:
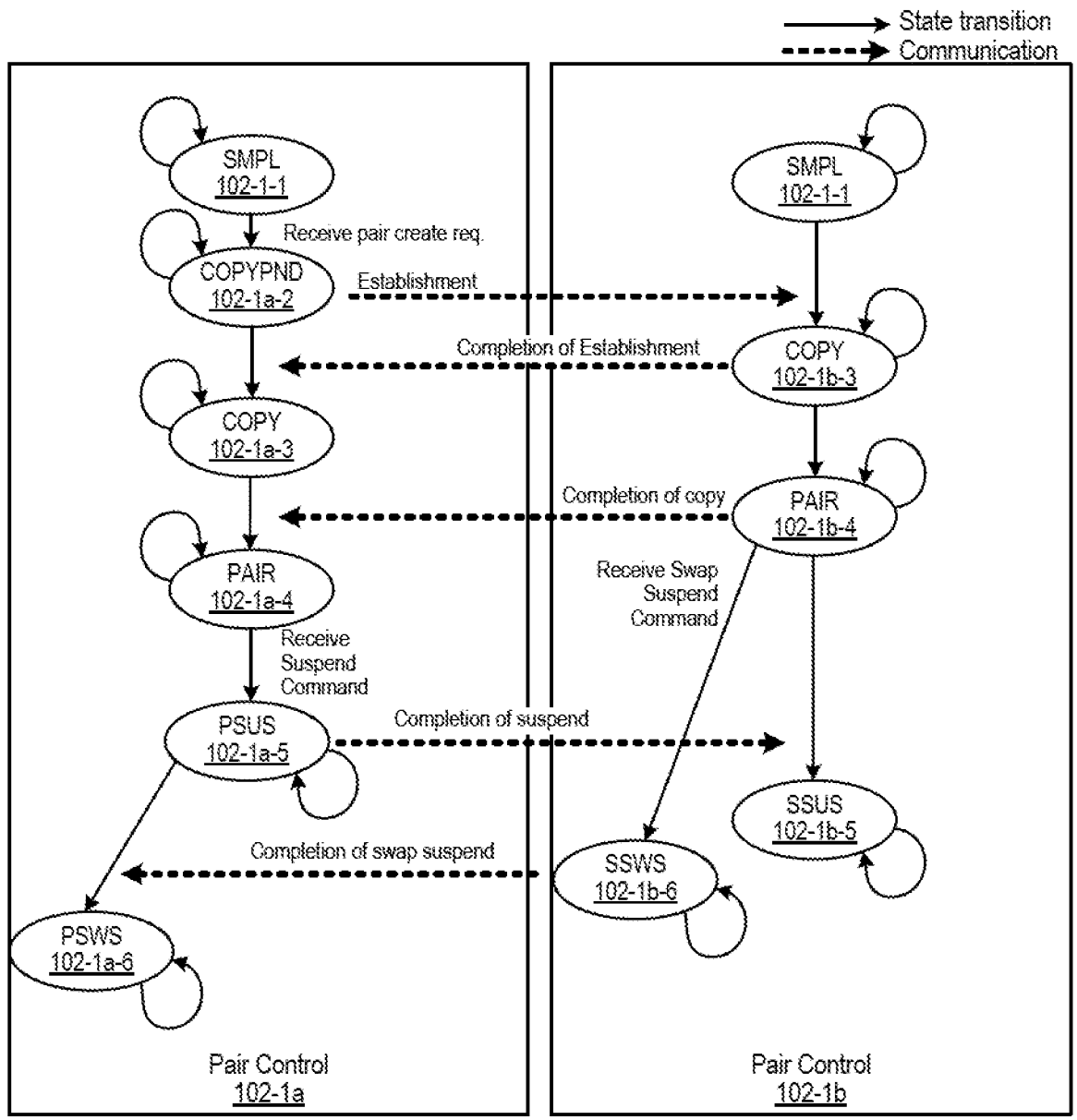
FIG. 11 illustrates the processes for Pair Control 102-1*a* and Pair Control 102-1*b*, in accordance with an example implementation.

FIG. 11 illustrates the processes for Pair Control 102-1$a$ and Pair Control 102-1$b$, in accordance with an example implementation. The control is based on the state machine of the volume pair, such as the information stored in Pair State 101-1-8. In FIG. 5, the solid lines show the state transition, and dashed lines show the communication message when the transition occurs.

When a primary and secondary volume is not an established pair, the state of both are SMPL 102-1-1. When a storage device receives a command to establish a pair on SMPL 102-1-1 state, the state of the primary volume becomes COPYPND 102-1a-2 and then the storage device sends an "Establishment" message to that pair. When a storage device receives the "Establishment" message on SMPL 102-1-1 state, the state of the secondary volume becomes COPY 102-1b-3, that storage returns a "Completion of Copy" message, and the secondary volume starts to copy from that primary volume to the secondary volume.

When a storage device receives the "Completion of Establishment" on COPYEND 102-1a-2, the state of the primary volume becomes COPY 102-1a-3 and waits for the message "Completion of Initial Copy" from the pair.

When a storage device finishes the initial copy on COPY 102-1b-3 state, the state of the secondary volume becomes PAIR 102-1b-4 and sends the "Completion of Copy" message to that pair. When a storage device receives the "Completion of Copy" message on COPY 102-1a-3 state, the state of the primary volume becomes PAIR 102-1 a-4. When a storage device receives a command to suspend a pair on PAIR 102-1-1 state, the state of the primary volume becomes PSUS 102-1a-5 and then the storage device sends an "Completion of Suspend" message to that pair. When a storage device receives the "Completion of Suspend" message on PAIR 102-1b-4 state, the state of the secondary volume becomes SSUS 102-1b-5.

When a storage device receives a command to "swap and suspend" a pair on PAIR 102-1b-4 state, the state of the primary volume becomes SSWS 102-1b-6 and then the storage device sends an "Completion of Swap Suspend" message to that pair. When a storage device receives the "Completion of Swap Suspend" message on PAIR 102-1a-4 state, the state of the secondary volume becomes SSUS 102-1b-5.

When a storage device receives a command to resync a pair on PSUS 102-1a-5 state, the state of the primary volume becomes COPYPND' 102-1b-2' and then the storage device sends an "Establishment" message to that pair. When a storage device receives the "Establishment" message on SSUS 102-1b-5 state, the state of the secondary volume becomes COPY 102-1b-3, that storage returns a "Completion of Establishment" message, and the secondary volume starts to copy from that primary volume to the secondary volume.

When a storage device receives the "Completion of Establishment" on COPYEND' 102-1a-2', the state of the primary volume becomes COPY 102-1a-3 and waits for the message "Completion of Copy" from the pair. When a storage device receives a command to resync a pair on SSWS 102-1a-6 state, the state of the secondary volume becomes COPYPND' 102-1b-2' and then the storage device sends an "Establishment" message to that pair.

When a storage device receives the "Establishment" message on PSWS 102-1b-b state, the state of the primary volume becomes COPY 102-1b-3, that storage returns a "Completion of Establishment" message, and the secondary volume starts to copy from that primary volume to the secondary volume. When a storage device receives the "Completion of Establishment" on COPYEND' 102-1b-2', the state of the primary volume becomes COPY 102-1a-3 and waits for the message "Completion of Copy" from the pair.

Figure 12:
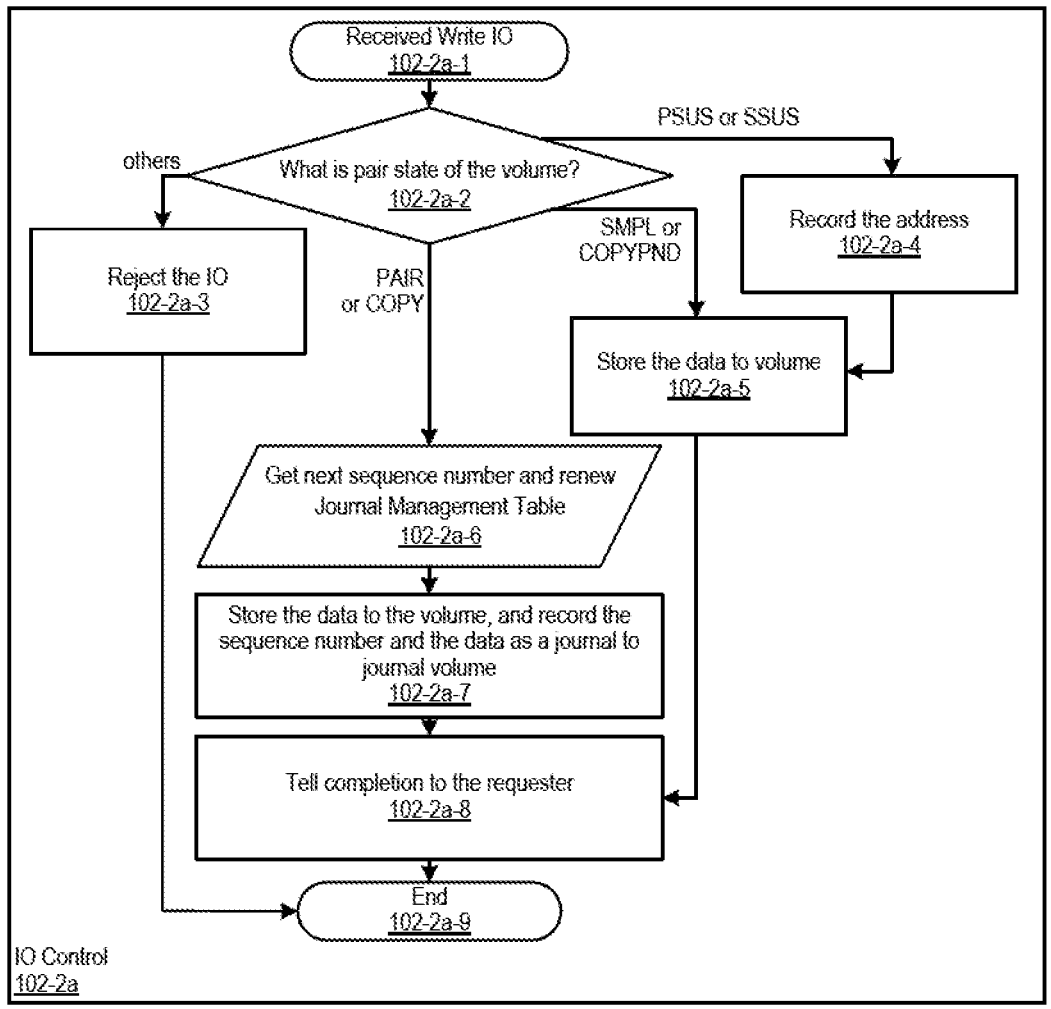
FIG. 12 illustrates an example flow for IO Control 102-2*a* for a primary volume, in accordance with an example implementation.

FIG. 12 illustrates an example flow for IO Control 102-2a for a primary volume, in accordance with an example implementation.

Step 102-2a-1 starts when the primary volume receives a write I/O. The write I/O command includes the starting LBA (logical block address) and block length. Write IO is allowed when the state is SMPL, COPYPND, COPY, PAIR, PSUS, SSWS. When the state is PAIR or COPY, the primary volume records journal data.

In an example flow of the write I/O command, the pair state of the primary volume is considered at 102-2a-2. If the state is PSUS or PSWS, then the flow proceeds to 102-2a-4 to record the address. If the state is SMPL or COPYPND, then the flow proceeds to 102-2a-5 to store the data associated with the write I/O to the volume. If the state is PAIR, or COPY, then the flow proceeds to 102-2a-6. If the state is any other state, then the flow proceeds to 102-2a-3 to reject the IO and end the flow at 102-2a-9.

At 102-2a-6, the flow obtains the next sequence number and renews the Journal Management Table. At 102-2a-7, the flow stores the data to the volume, and records the sequence number and the data as a journal to journal volume. At 102-2a-8, the flow sends a completion to the requester.

Figure 13:
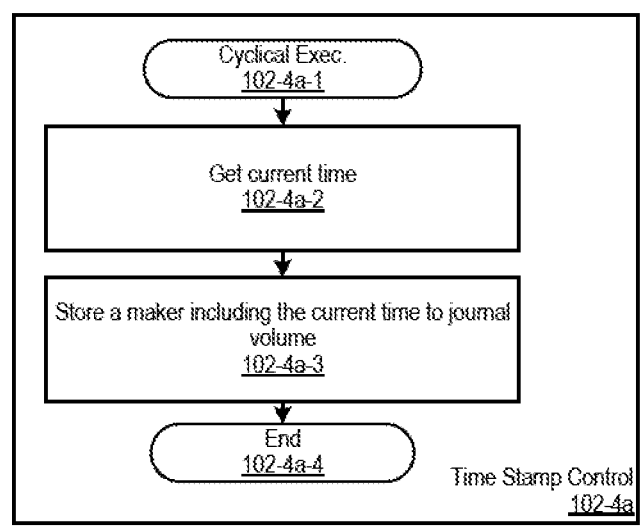
FIG. 13 illustrates an example flow of Time Stamp Control 102-4*a* for a storage device managing primary volumes, in accordance with an example implementation.

FIG. 13 illustrates an example flow of Time Stamp Control 102-4a for a storage device managing primary volumes, in accordance with an example implementation.

Step 102-4a-1 starts cyclically (for example, every second or otherwise in accordance with the desired implementation). At 102-4a-2, the process obtains the current time. At 102-4a-3, the process stores a maker including the current time to the journal volume. At 102-4a-4, the process ends.

Figure 14:
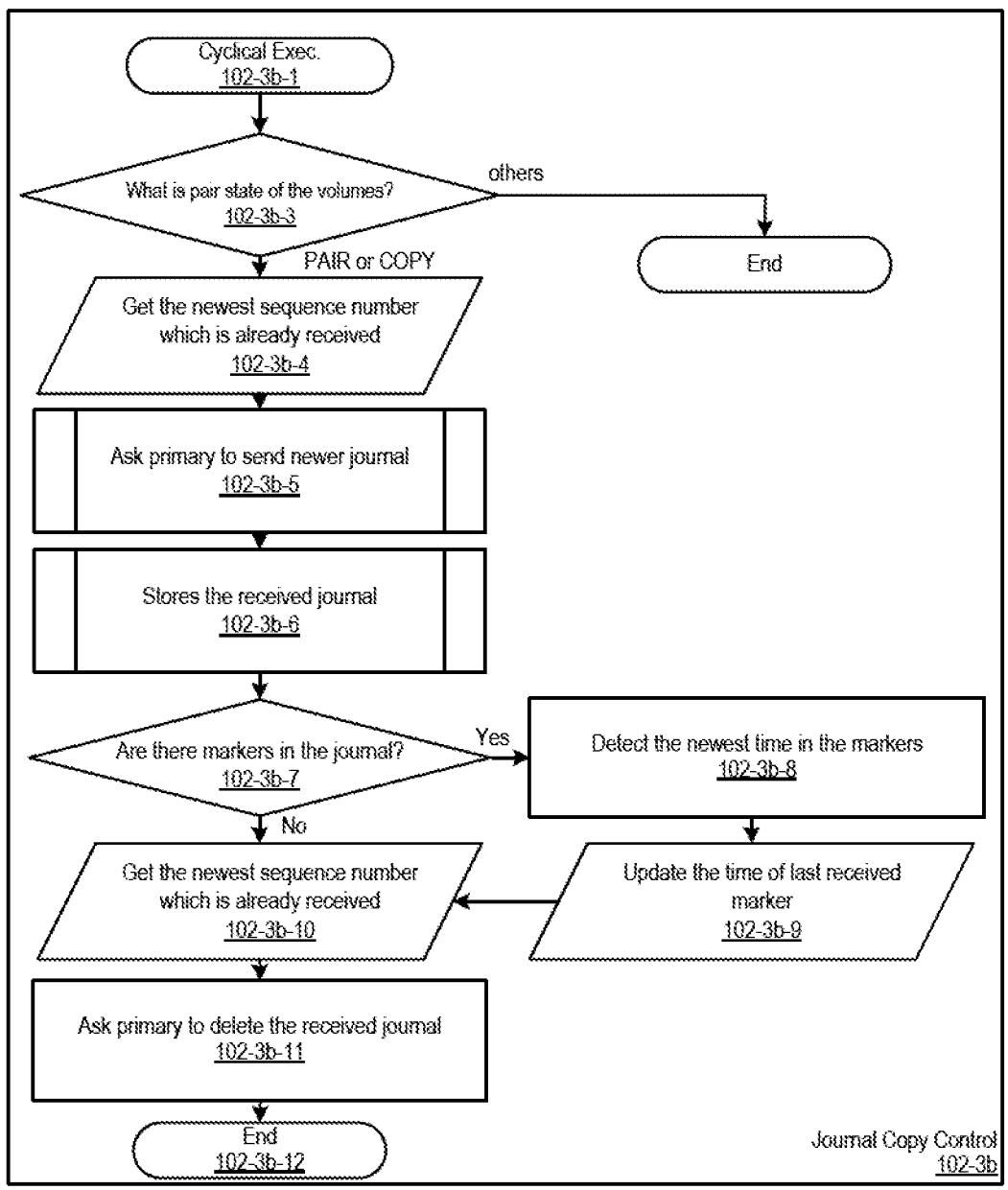
FIG. 14 illustrates example flow diagrams of Journal Copy Control 102-3*b* for a journal volume of secondary volumes, in accordance with an example implementation.

FIG. 14 illustrate example flow diagrams of Journal Copy Control 102-3b for a journal volume of secondary volumes, in accordance with an example implementation. Step 102-3b-1 starts cyclically (for example, every second or otherwise in accordance with the desired implementation). The program requires a continuation of the previous acquisition to a paired storage device by sending a newest journal ID. After receiving the ID list and journal data, the program stores the journal data to the own journal volume and requests deletion while sending the ID list. When receiving markers in the journal data, the program checks for the newest time in the markers.

At 102-3b-3, the process determines the pair state of the volumes. If the state is not PAIR or COPY, then the process ends, otherwise, the process proceeds to 102-3b-4 to get the newest sequence number that has already been received. At 102-3b-5, the process requests the primary volume to send newer journals, if available. At 102-3b-6, the process stores the received newer journals, if any are available.

At 102-3b-7, a determination is made as to whether there are markers in the journal. If so (Yes), then the process proceeds to detect the newest time in the markers at 102-3b-8 and update the time of the last received marker at 102-3b-9.

Otherwise (No), the process proceeds to get the newest sequence number that has been received at 102-3b-10. At 102-3b-11, the process requests the primary volume to delete the received journal. At 102-3b-12, the process ends.

Figure 15:
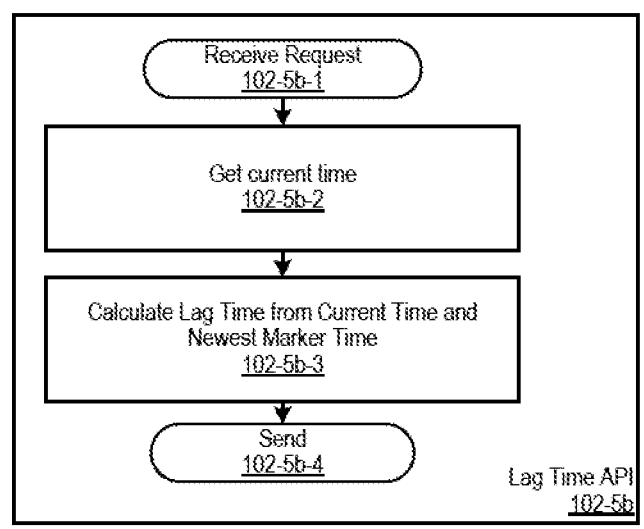
FIG. 15 illustrates an example flow of Lag Time API 102-5*b* a for a storage device managing secondary volumes, in accordance with an example implementation.

FIG. 15 illustrates an example flow of Lag Time API 102-5b a for a storage device managing secondary volumes, in accordance with an example implementation. Step 102-5b-1 starts when the storage receives a lag time request command. At 102-5b-2, the process obtains the current time. At 102-5b-3, the process calculates lag time based on the difference between the current time and the time of the newest marker. At 102-5b-4, the process responses the lag time and ends.

Storage Management Service 200-1 periodically calls this API and stores the obtained values in the Lag Time Log Database 200-5 as a set with the current time.

Figure 16:
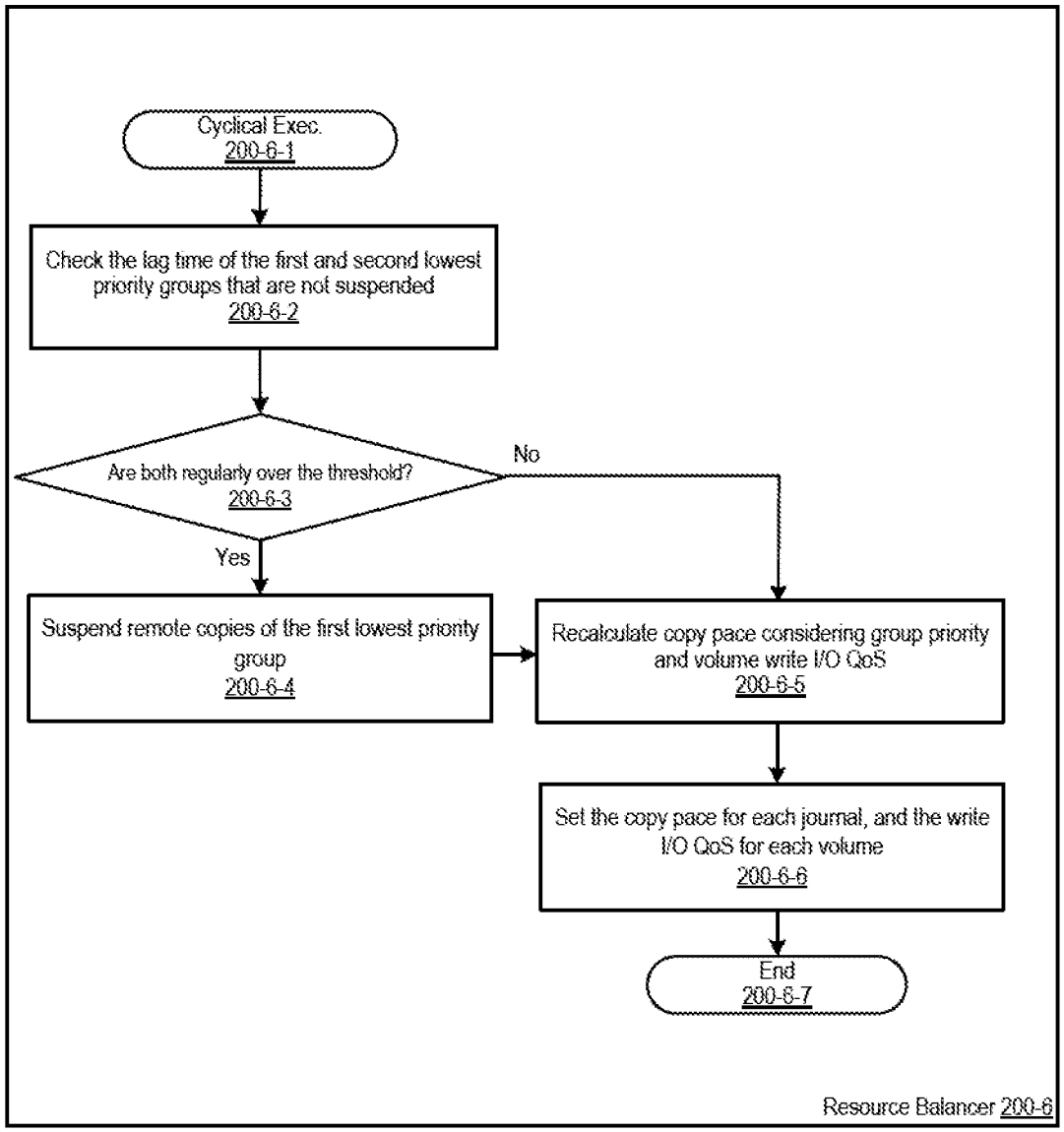
FIG. 16 illustrates example flow diagrams of Resource Balancer 200-6 to prioritize copying for groups with more stringent RPO setting policies when journal accumulation increases due to insufficient transfer bandwidth, in accordance with an example implementation.

FIG. 16 illustrate example flow diagrams of Resource Balancer 200-6 to prioritize copying for groups with more stringent RPO setting policies when journal accumulation increases due to insufficient transfer bandwidth, in accordance with an example implementation.

Step 200-6-1 starts cyclically (for example, every minute or otherwise in accordance with the desired implementation). At 200-6-2, the process extracts policy groups with unsuspended volumes, and checks the lag times of the first and second lowest priority (longest RPO) groups. At 200-6-3, the process suspends the remote copy of the lowest priority group if both lag times exceed the RPO set for each group. At 200-6-5, the process recalculates copy pace for each journal group considering group priority and volume write I/O QoS parameters considering SLA setting. At 200-6-6, the process applies the copy pace to each journal group and write I/O QoS to each volume. At 200-6-7, the process ends.

Figure 17:
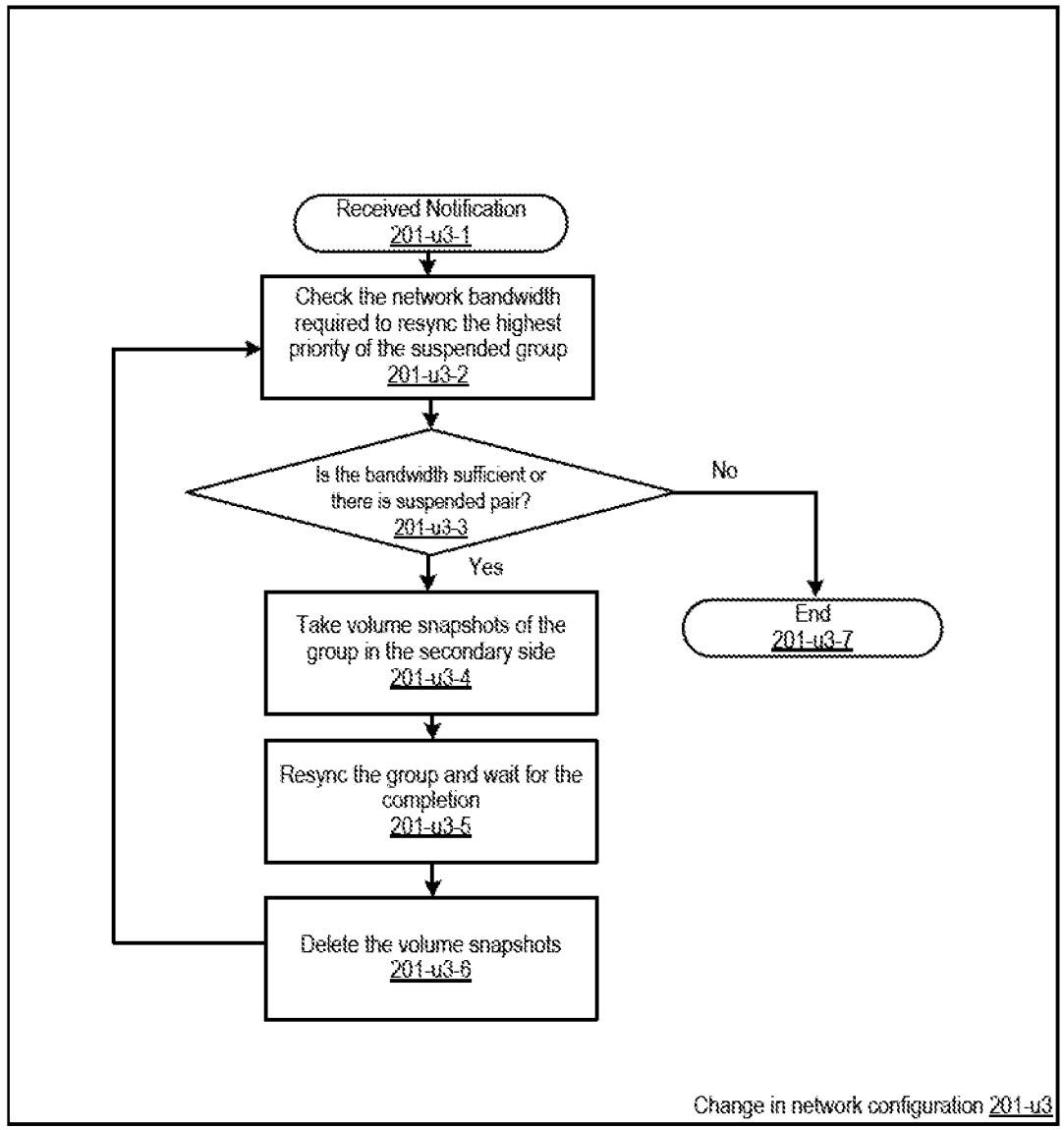
FIG. 17 illustrates example flow diagrams of Storage Management Service 200-1 when notified of a change in network configuration in use case, in accordance with an example implementation.

FIG. 17 illustrate example flow diagrams of Storage Management Service 200-1 when notified of a change in network configuration in use case, in accordance with an example implementation. The role of this program is to resume the suspended remote copying as the network bandwidth shortage is resolved. Step 201-u3-1 starts when the storage receives a notification corresponding to system reconfiguration. In Step 201-u3-2, the process checks to see if the configuration change has resulted in sufficient bandwidth to resume the suspended remote copy. At step 201-u3-3, a determination is made as to whether there is insufficient bandwidth, or whether there are no suspended remote copy pairs. If not (no), then the process ends at 201-u3-7, otherwise (Yes) the process proceeds to step 201-u3-4. At Step 201-u3-4, the process takes a snapshot of the secondary volumes to save the data before resync operation. The purpose is to deal with failover during resync process.

At Step 201-u3-5, the process orders to resync the volumes to resume remote copy, and wait for the completion. At Step 201-u3-6, the process deletes the snapshot took before the resync.

FIG. 18 illustrates example formulations to calculate bandwidth set for each journal group copy and write throughput set for each volume, in accordance with an example implementation.

F200 specifies the bandwidth to be given to each policy so that the total bandwidth used by the copies does not exceed the allowed network bandwidth. If bandwidth is sufficient, no limit is set ($\zeta_j=1$); if bandwidth is insufficient, an appropriate policy is selected to limit the bandwidth ($0<\zeta_j<1$) to be given or to suspend copy ($\zeta_j=0$). In the example shown in FIG. 16, a group of policies with a long RPO is preferentially selected. F201 specifies the throughput to be given to each volume so that the total write throughput in one policy group does not exceed the allowed copy bandwidth for the policy group.

In the example of FIG. 18, the allocated bandwidth for policy group j is $\zeta_j b_j$. If bandwidth is sufficient, no limit is set ($\zeta_j=1$); if bandwidth is insufficient, an appropriate policy is selected to limit the bandwidth ($0<\zeta_j<1$) to be given or to suspend copy ($\zeta_j=0$). In the example shown in FIG. 16, a group of policies with a long RPO is preferentially selected.

In the example of FIG. 18, the allocated throughput for volume i is $\rho_i W_i$. The throughput is adjustable within $w_i \leq \rho_i W_i \leq W_i$. $\Sigma_j \delta_{ij}=1$ Means volume i belongs to only one groups. Total throughput of the policy should satisfy $b_j \geq \Sigma_i^n \delta_{ij} \rho_i W_i$.

In the example implementations described above, lag time is obtained from Storage Device 100b where the second volume is stored, but lag time may be obtained from Storage Device 100a where the primary volume is stored in accordance with another example implementation. In this case, the lag time is obtained by retrieving the oldest marker that has not been transferred to the secondary volume from Journal Volume 100-VJ and obtaining the time stored there. In such an example implementation, as the primary storage system managing the primary volume would have the oldest untransferred marker, then the primary storage system will thereby execute the calculation of the lag time based on the oldest untransferred marker in its system.

In the example implementations described above, the journal copy method is used for asynchronous remote copy, but an intermittent differential copy method can be used instead in accordance with the desired implementation. In such an example implementation, the lag time is determined by calculating the difference between the time when the consistent differential data is determined and the current time instead of utilizing a marker. The differential data is used to derive the lag time when the system is utilizing intermittent differential copy instead of asynchronous remote copy.

Further, in the example implementations described above, the snapshot of the suspended secondary volume was taken just before resync, but a snapshot may be taken immediately after the suspend operation in accordance with the desired implementation. In such an example implementation, the step for deleting the snapshot can thereby be omitted.

Through the example implementations described herein, in environments with remote copies, "recovery time objective" violations can be easily detected, and when violations occur, high priority ones can be protected as much as possible.

Figure 19:
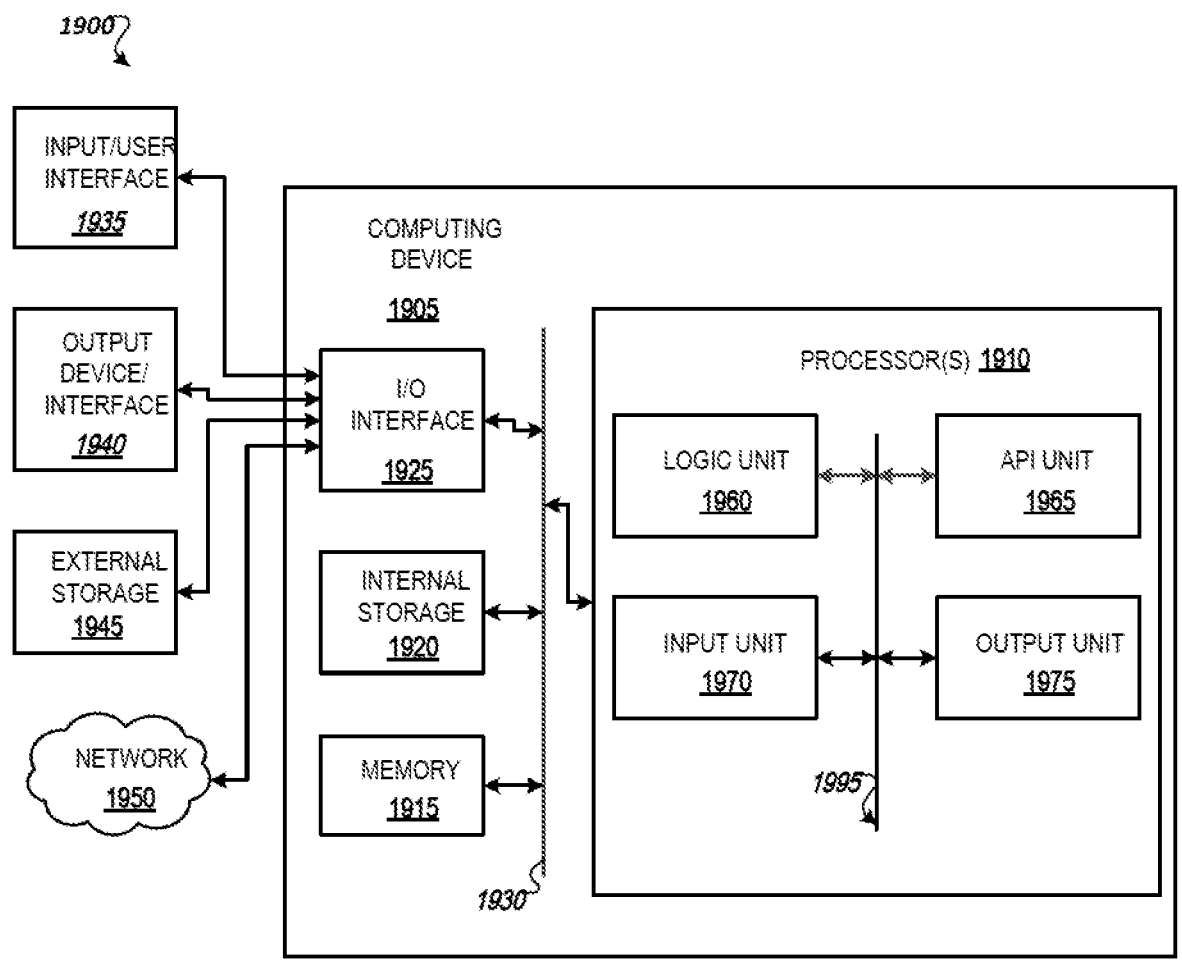
FIG. 19 illustrates an example computing environment with an example computer device suitable for use in some example implementations.

FIG. 19 illustrates an example computing environment with an example computer device suitable for use in some example implementations, such as server 200, storage devices 100a, 100c, 100b, 100d, and primary/secondary storage systems (storage device and server(s)). Computer device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and/or I/O interface 1925, any of which can be coupled on a communication mechanism or bus 1930 for communicating information or embedded in the computer device 1905. I/O interface 1925 is also configured to receive images from cameras or provide images to projectors or displays, depending on the desired implementation.

Computer device 1905 can be communicatively coupled to input/user interface 1935 and output device/interface 1940. Either one or both input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1940 may include a display, television, monitor, printer, speaker, braille, or the like. In some example implementations, input/user interface 1935 and output device/interface 1940 can be embedded with or physically coupled to the computer device 1905. In other example implementations, other computer devices may function as or provide the functions of input/user interface 1935 and output device/interface 1940 for a computer device 1905.

Examples of computer device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1905 can be communicatively coupled (e.g., via I/O interface 1925) to external storage 1945 and network 1950 for communicating with any number of networked components, devices, and systems, including one or more computer devices of the same or different configurations. Computer device 1905 or any connected computer device can be functioning as, providing services of, or referred to as a server, client, thin server, general machine, special-purpose machine, or another label.

I/O interface 1925 can include, but is not limited to, wired and/or wireless interfaces using any communication or/O protocols or standards (e.g., Ethernet, 802.11x, Universal System Bus, WiMAX, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computer device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, input unit 1970, output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide output based on the calculations described in the example implementations.

Processor(s) 1910 can be configured to execute a method or instructions involving, for an execution of a remote copy operation from a primary storage system to a secondary storage system, calculating lag time from a current time and latest copy time received during execution of the remote copy operation as described with respect to FIGS. 1 and 2. The calculation can be done either by the primary storage system (storage device with primary volume and server combination) or the secondary storage system (storage device with secondary volume and server combination) depending on the desired implementation.

Processor(s) 1910 can be configured to execute a method or instructions as described above, wherein the remote copy operation is an asynchronous remote copy operation between the primary storage system and the secondary storage system, and wherein the method or instructions can further involve, for the execution of the remote copy operation from the primary storage system to the secondary storage system, periodically inserting, by the primary storage system, a marker into a journal of the asynchronous remote copy operation, the marker associated with time information as illustrated in FIGS. 2, 9, 11, and 14. The periodic insertion of markers can be conducted by either the primary storage system or the secondary storage system depending on the desired implementation.

Processor(s) 1910 can be configured to execute a method or instructions as described above, and further involve, for the execution of the remote copy operation from the primary storage system to the secondary storage system, obtaining a latest copy time by finding a most recently transferred marker (e.g., from the primary storage system to the secondary storage system) or an oldest untransferred marker (e.g., at the primary storage system), and referencing the time information associated with the most recently transferred marker or the oldest untransferred marker, as illustrated in FIGS. 2, 9, 11, 14, and 15. The obtaining the latest time and referencing the time information can be conducted by either the primary storage system or the secondary storage system depending on the desired implementation. As described herein, for the latest copy time being obtained from the oldest untransferred marker, the calculating lag time from the current time and the latest copy time is executed by the primary storage system, and for the latest copy time being obtained from the most recently transferred marker, the calculating lag time from the current time and the latest copy time is executed by the secondary storage system after transfer of the marker.

Processor(s) 1910 can be configured to execute a method or instructions as described above and further involve, for the calculated lag time exceeding a threshold limit set in a policy, transmitting an alert to a management server.

Processor(s) 1910 can be configured to execute a method or instructions as described above, and further involve, for the calculated lag time exceeding a threshold limit set in a policy, limiting a copy transfer rate of a volume relating to the policy.

Processor(s) 1910 can be configured to execute a method or instructions as described above, and further involve, for the calculated lag time exceeding a threshold limit set in a policy, suspending one or more remote copy pairs based on a tier of the one or more remote copy pairs as described with respect to FIG. 16.

Processor(s) 1910 can be configured to execute a method or instructions as described above, and further involve taking a snapshot of corresponding volumes in the secondary storage system associated with the one or more remote copy pairs after the suspension is executed.

Processor(s) 1910 can be configured to execute a method or instructions as described above, and further involve, for a determination to resynchronize a highest priority one of the suspended one or more remote copy pairs based on available bandwidth and the tier of the one or more remote copy pairs, taking a snapshot of corresponding volumes in the secondary storage system associated with the highest priority one of the suspended one or more remote copy pairs; and resynchronizing the highest priority one of the suspended one or more remote copy pairs after the snapshot is taken as described with respect to FIG. 17.

Depending on the desired implementation, the primary storage system and the secondary storage system manages remote copy operations according to one or more policies, each of the one or more policies associated with a recovery point objective (RPO). Accordingly, for the calculated lag time reaching a threshold limit set in the one or more policies, the primary storage system and the secondary storage system suspends one or more of the remote copy operations based on strictness of the associated RPO as described with respect to FIGS. 16 to 18.

Processor(s) 1910 can be configured to execute a method or instructions as described above, wherein the remote copy operation is an intermittent differential copy operation, wherein the latest copy time is based on obtaining a time when consistent differential data is determined. In this manner, besides asynchronous copy operation, differential copy operations can thereby be facilitated.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing." "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, drives, or any other types of tangible or non-transitory media suitable for storing electronic information.

A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art firm consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
for an execution of a remote copy operation from a primary storage system to a secondary storage system:
calculating lag time from a current time and latest copy time received during the execution of the remote copy operation;
for the calculated lag time exceeding a threshold limit set in a policy, suspending one or more remote copy pairs based on a tier of the one or more remote copy pairs; and
for a determination to resynchronize a highest priority one of the suspended one or more remote copy pairs based on available bandwidth and the tier of the one or more remote copy pairs:
taking a snapshot of corresponding volumes in the secondary storage system associated with the highest priority one of the suspended one or more remote copy pairs; and resynchronizing the highest priority one of the suspended one or more remote copy pairs after the snapshot is taken.

2. The method of claim 1, wherein the remote copy operation is an asynchronous remote copy operation between the primary storage system and the secondary storage system, and wherein the method further comprises, for the execution of the remote copy operation from the primary storage system to the secondary storage system, periodically inserting, by the primary storage system, a marker into a journal of the asynchronous remote copy operation, the marker associated with time information.

3. The method of claim 1, further comprising, for the execution of the remote copy operation from the primary storage system to the secondary storage system:
obtaining the latest copy time by finding a most recently transferred marker or an oldest untransferred marker, and
referencing time information associated with the most recently transferred marker or the oldest untransferred marker.

4. The method of claim 3, wherein for the latest copy time being obtained from the oldest untransferred marker, the calculating lag time from the current time and the latest copy time is executed by the primary storage system.

5. The method of claim 3, wherein for the latest copy time being obtained from the most recently transferred marker, the calculating lag time from the current time and the latest copy time is executed by the secondary storage system after transfer of the marker.

6. The method of claim 1, further comprising, for the calculated lag time exceeding a threshold limit set in a policy, transmitting an alert to a management server.

7. The method of claim 1, further comprising, for the calculated lag time exceeding a threshold limit set in a policy, limiting a copy transfer rate of a volume relating to the policy.

8. The method of claim 1, further comprising taking a snapshot of corresponding volumes in the secondary storage system associated with the one or more remote copy pairs after suspension is executed.

9. The method of claim 1, wherein the primary storage system and the secondary storage system manages remote copy operations according to one or more policies, each of the one or more policies associated with a recovery point objective (RPO),
wherein for the calculated lag time reaching a threshold limit set in the one or more policies, the primary storage system and the secondary storage system suspends one or more of the remote copy operations based on strictness of the associated RPO.

10. The method of claim 1, wherein the remote copy operation is an intermittent differential copy operation, wherein the latest copy time is based on obtaining a time when consistent differential data is determined.

11. A non-transitory computer readable medium, storing instructions for executing a process, the instructions comprising:
for an execution of a remote copy operation from a primary storage system to a secondary storage system:
calculating lag time from a current time and latest copy time received during the execution of the remote copy operation;
for the calculated lag time exceeding a threshold limit set in a policy, suspending one or more remote copy pairs based on a tier of the one or more remote copy pairs; and
for a determination to resynchronize a highest priority one of the suspended one or more remote copy pairs based on available bandwidth and the tier of the one or more remote copy pairs:
taking a snapshot of corresponding volumes in the secondary storage system associated with the highest priority one of the suspended one or more remote copy pairs; and
resynchronizing the highest priority one of the suspended one or more remote copy pairs after the snapshot is taken.

12. An apparatus, comprising:
a processor, configured to:
for an execution of a remote copy operation from a primary storage system to a secondary storage system:
calculate lag time from a current time and latest copy time received during the execution of the remote copy operation;
for the calculated lag time exceeding a threshold limit set in a policy, suspend one or more remote copy pairs based on a tier of the one or more remote copy pairs; and
for a determination to resynchronize a highest priority one of the suspended one or more remote copy pairs based on available bandwidth and the tier of the one or more remote copy pairs:
take a snapshot of corresponding volumes in the secondary storage system associated with the highest priority one of the suspended one or more remote copy pairs; and
resynchronize the highest priority one of the suspended one or more remote copy pairs after the snapshot is taken.

* * * * *